Figure 1:
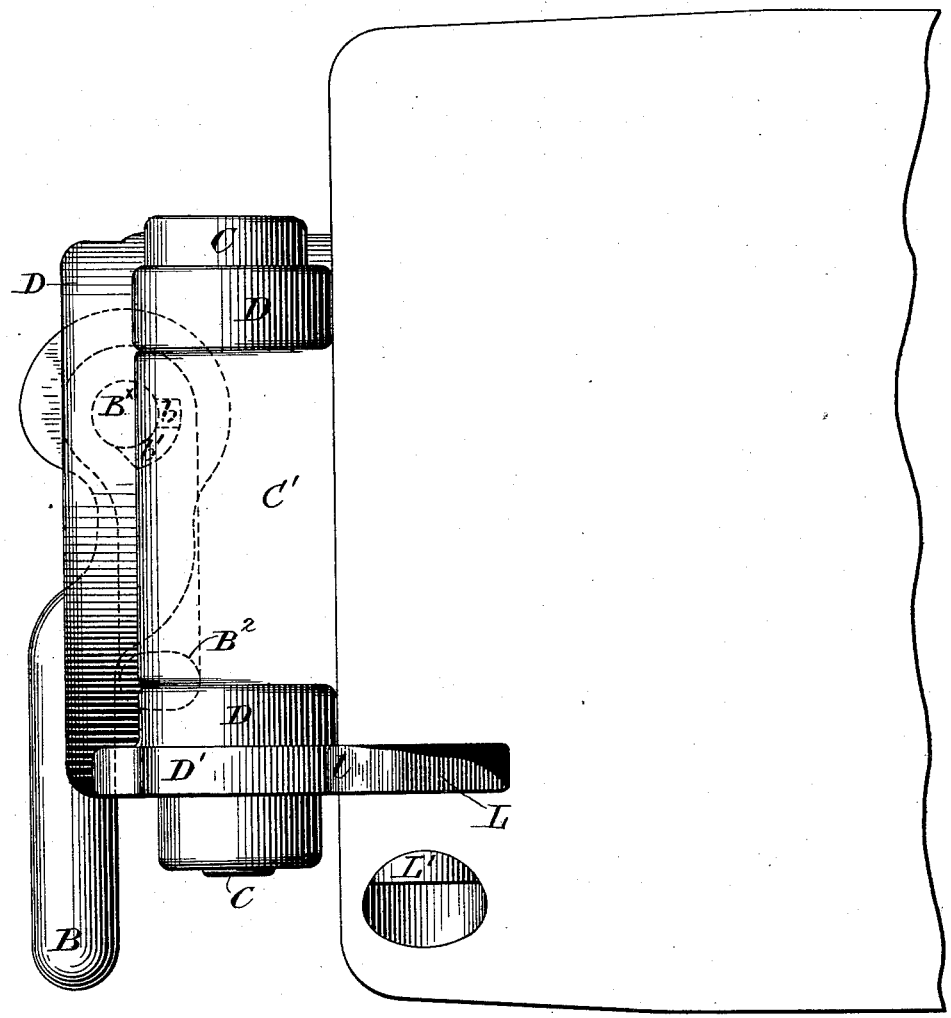

(No Model.) 7 Sheets—Sheet 1.

C. HOLMSTRÖM.
BREECH LOADING QUICK FIRING GUN.

No. 469,814. Patented Mar. 1, 1892.

(No Model.)  C. HOLMSTRÖM.  7 Sheets—Sheet 4.
BREECH LOADING QUICK FIRING GUN.
No. 469,814.  Patented Mar. 1, 1892.
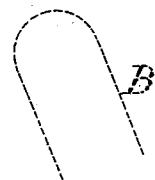
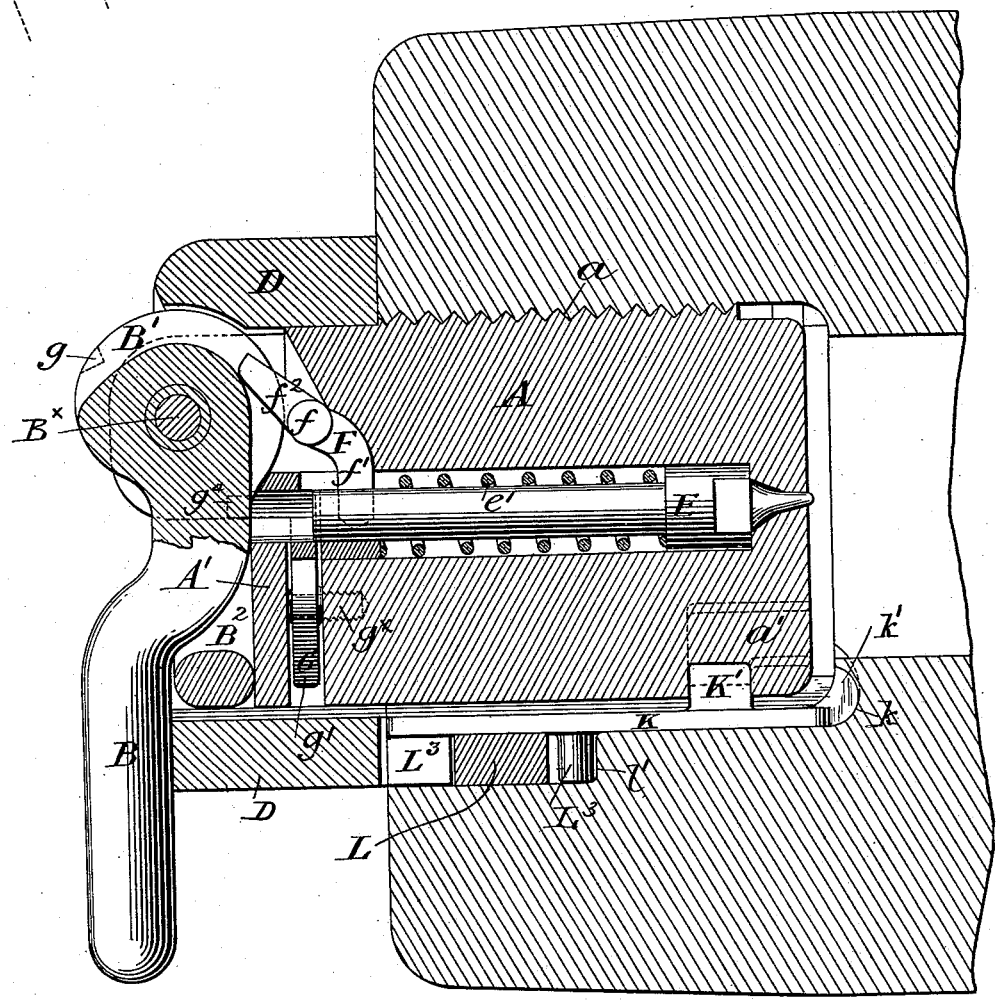
Fig. 4.
Witnesses
P. Washington Miller
C. M. Brooke
Inventor
Carl Holmström
By his Attorneys,
Baldwin Davidson & Wight

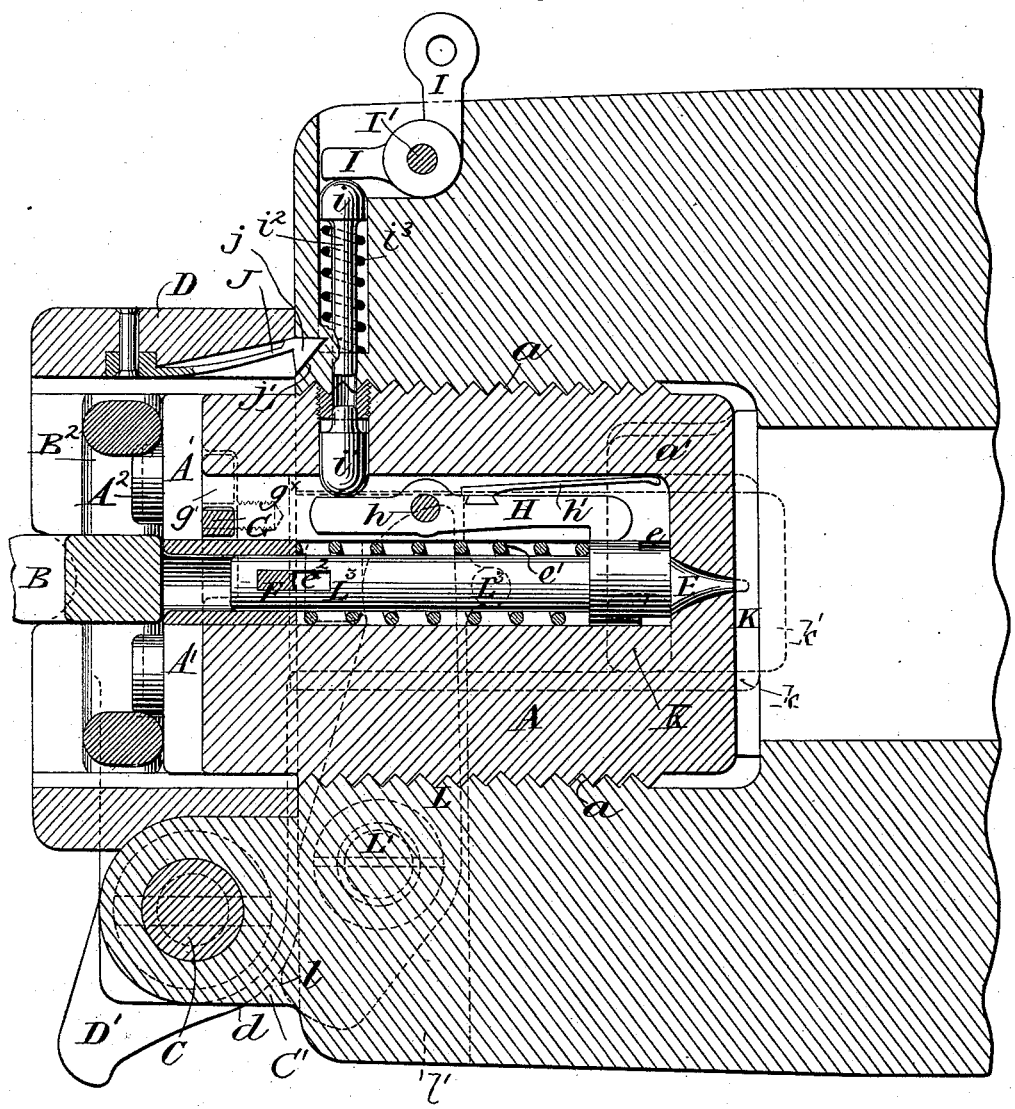

(No Model.) 7 Sheets—Sheet 6.
C. HOLMSTRÖM.
BREECH LOADING QUICK FIRING GUN.
No. 469,814. Patented Mar. 1, 1892.
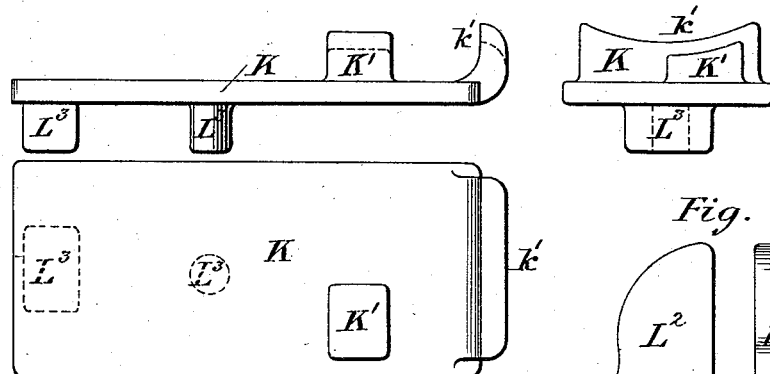
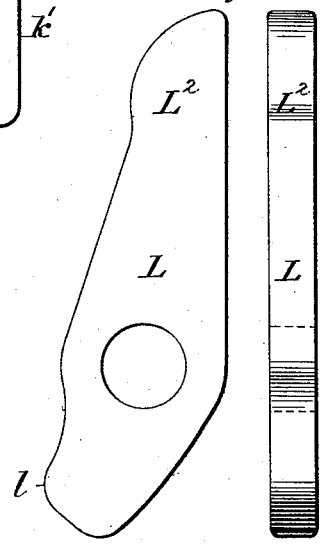
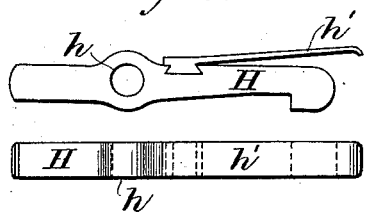
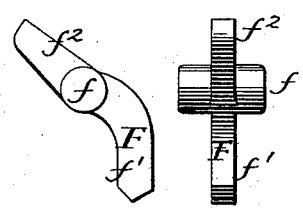
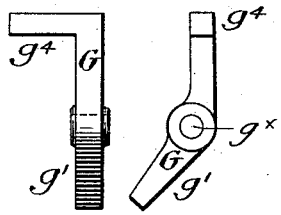
Witnesses
B. Washington Miller
C. M. Brooke
Inventor
Carl Holmström
By his Attorneys
Baldwin Davidson & Wright (No Model.) 7 Sheets—Sheet 7.
C. HOLMSTRÖM.
BREECH LOADING QUICK FIRING GUN.
No. 469,814. Patented Mar. 1, 1892.
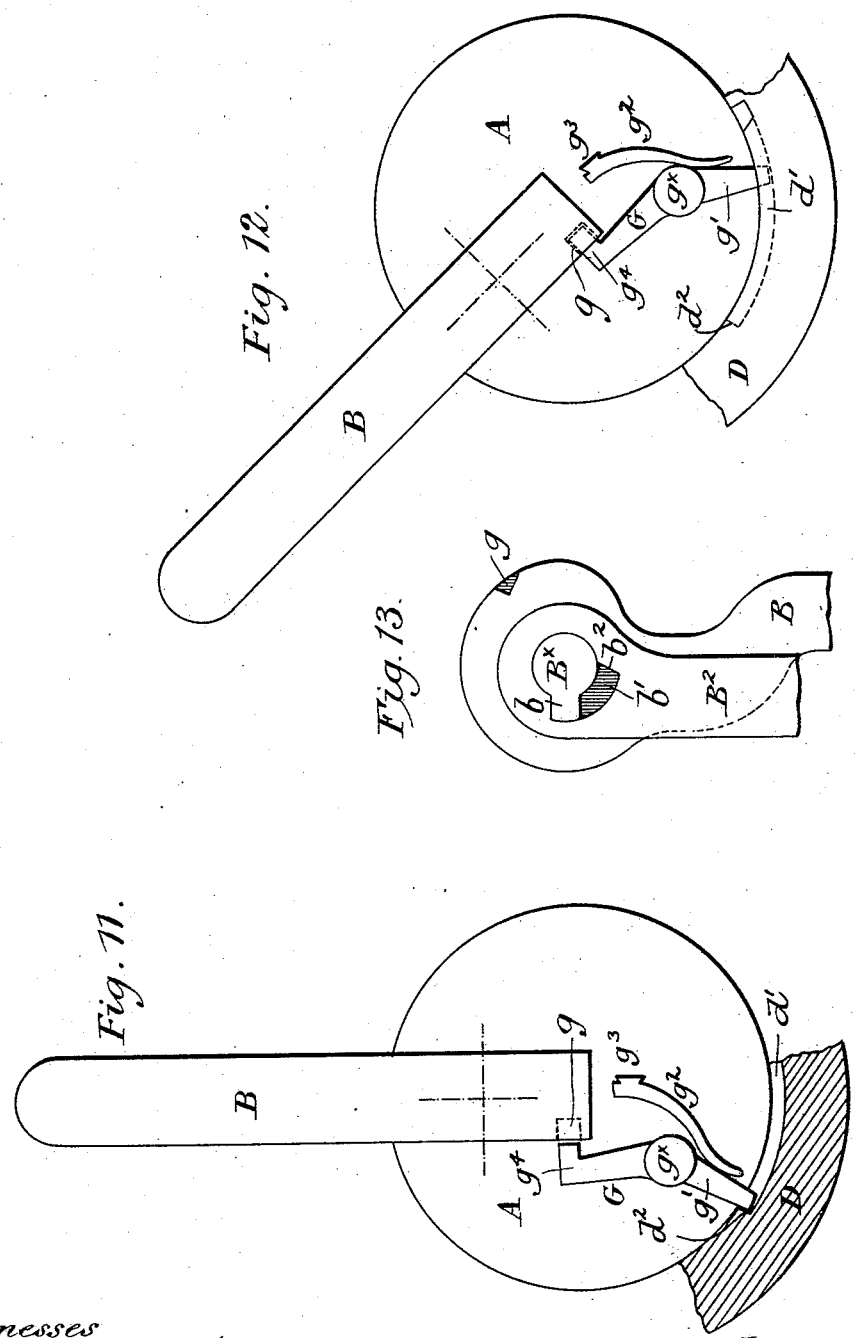
Witnesses
P. Washington Miller
C. M. Brooke
Inventor
Carl Holmström,
By his Attorneys
Baldwin Davidson & Wight

United States Patent Office.

CARL HOLMSTRÖM, OF WESTMINSTER, ENGLAND, ASSIGNOR OF ONE-HALF TO FRANCIS EDWARD DYKE ACLAND, OF SAME PLACE.

BREECH-LOADING QUICK-FIRING GUN.

SPECIFICATION forming part of Letters Patent No. 469,814, dated March 1, 1892.

Application filed March 24, 1891. Serial No. 386,240. (No model.)

*To all whom it may concern:*

Be it known that I, CARL HOLMSTRÖM, civil engineer, a subject of the King of Sweden, residing at No. 32 Victoria Street, in the city of Westminster, England, have invented certain new and useful Improvements in Breech-Loading Quick-Firing Guns, of which the following is a specification.

A breech-loading gun constructed in accordance with my invention has the breech closed, as is usual, by means of a breech-block secured in the gun by a divided screw-thread. The breech is opened by giving to the block a partial turn and drawing it rearwardly. A ring surrounding the breech-block is connected with the breech of the gun by a vertical pivot or hinge-joint. The block is turned by a handle jointed to its rear end a little above the axis of the block. When the gun is ready for firing, the handle is folded downward; but for opening the breech the handle is raised until it projects radially upward. During the upward movement of the handle it operates upon a lever, which engages with a firing-pin and draws it backward. A sear within the breech-block then engages with the firing-pin. The cocking-lever, however, holds the firing-pin independently of the sear until the radial handle is again folded down, and this, as will be hereinafter explained, cannot be done except when the breech is closed. In addition to the radial handle before mentioned for turning the breech-block to lock and unlock it, I employ a ring-handle, serving to move the block in and out of the gun. This is loose on the pivot on which the radial handle is fixed. When not in use the ring-handle folds down, but when the radial handle is raised the ring-handle also is lifted by a projection on the pivot coming against the ring-handle, and so it is presented within convenient reach of the hand of the operator. A catch-lever is pivoted in the breech-block, and when the breech is locked the outer end of the catch rests against a stop in the carrier-ring, and thus prevents its head or inner end from engaging with a notch in the radial handle. The rotation of the breech-block in the carrier-ring, however, at once sets free the catch-lever, and a spring causes it to drop in and lock the radial handle, so as to prevent it from turning downward to the position which it occupies when the breech is ready for firing. When the block is clear of the breech, the carrier-ring is moved around its vertical pivot, and so the breech-block is carried away to one side and the bore is left clear. As the ring retires from the breech of the gun a spring-catch upon it escapes from an incline upon the gun and engages with the breech-block and holds it in place in the ring, so that it cannot be pushed forward again through the ring until (after loading) the ring is returned to its place against the rear face of the breech. The extractor lies in a groove in the breech below the seat for the breech-block. It has a projection on its inner face, which enters a right-angled or bayonet groove in the fore end of and passing partially around the breech-block. As the breech-block turns, the screw-threads cause it to be drawn rearwardly to a certain small extent, and it carries the extractor back with it and so loosens the cartridge-case in the bore of the gun. The groove in the breech-block is so formed that when the breech-block is unlocked it can be drawn back, leaving the extractor behind in the gun. The extractor with the cartridge-case then remains at rest until the carrier-ring is moved back to convey the breech-block to one side, and then a lug having a cam-surface and connected with the carrier-ring operates, preferably, by means of a lever to impart to the extractor a further movement, which is at first slow and powerful, but afterward is rapid, and so the extractor is caused to throw the cartridge-case out clear of the gun.

The details of construction and the manner of operating the parts for loading and firing will be hereinafter described.

Figure 2:
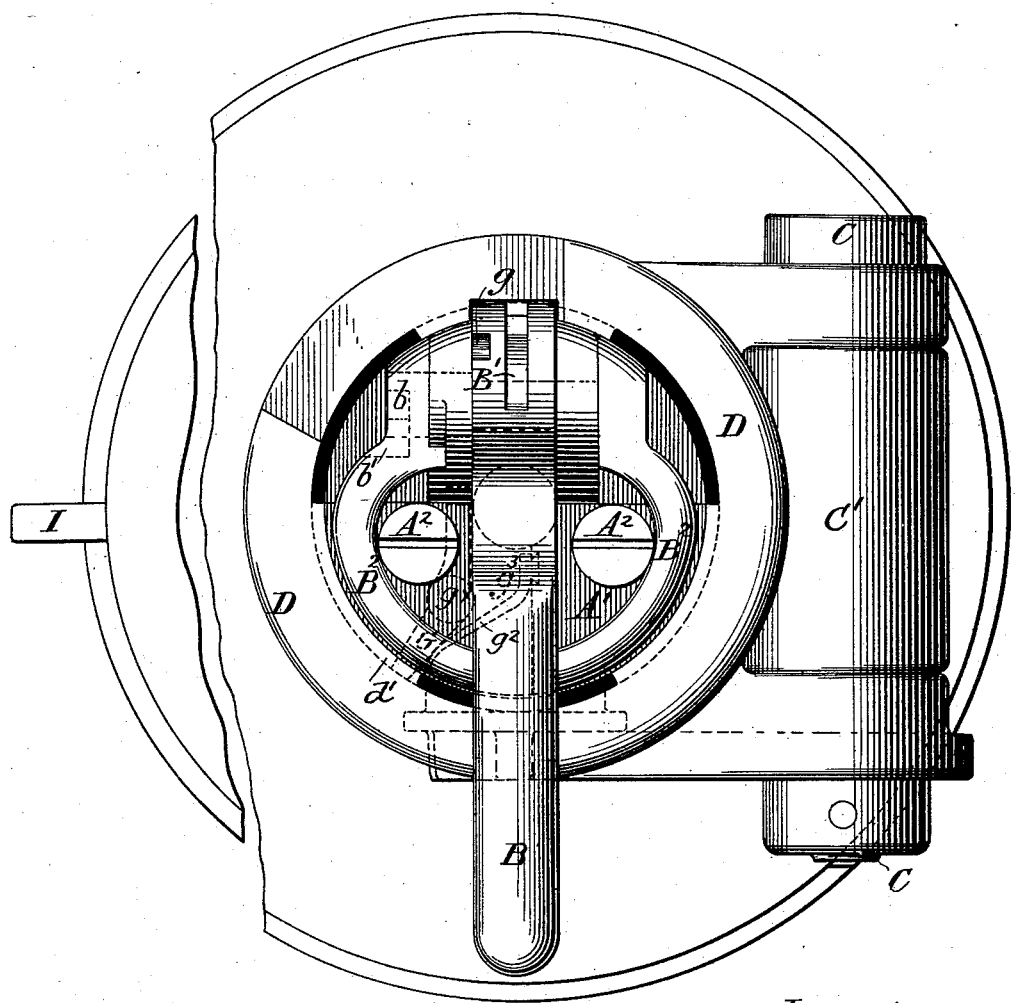
Figure 3:
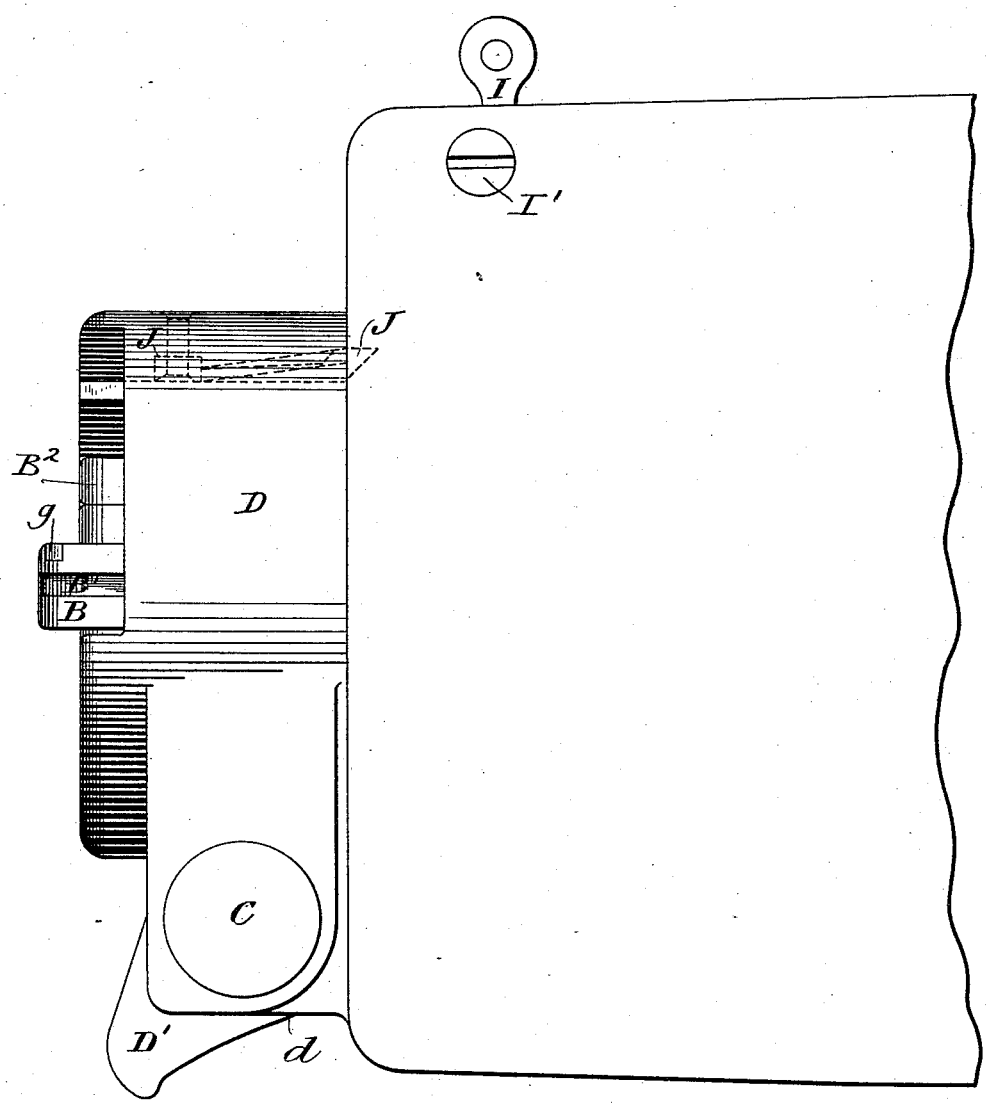

In the accompanying drawings, Figure 1 is a side elevation showing the breech end of the gun. Fig. 2 is a rear elevation, partly broken away. Fig. 3 is a plan. Fig. 4 is a longitudinal vertical section. Fig. 5 is a horizontal section. Fig. 6 shows in detail the construction of the extractor. Fig. 7 shows the construction of the lever which operates the extractor. Fig. 8 shows the sear. Fig. 9 shows the cocking-lever. Fig. 10 shows the safety locking-lever. Fig. 11 is a diagram to illustrate the operation of the safety locking-lever. Fig. 12 is a similar diagram showing the parts in a different position. Fig. 13 is a detail view showing the connection between the radial handle and the ring handle.

The breech-block A is locked in the gun by a divided screw-thread $a$. A radial handle B is hinged or jointed to the rear end of the breech-block (see Fig. 2) and may move from the position shown in full lines in Fig. 4 to that shown in dotted lines in the same figure. The carrier-ring D encircles the rear end of the breech-block and is hinged or pivoted on a vertical pin C, carried by a bracket C' on the rear end of the gun. A ring-handle $B^2$ is pivoted to move about the same axis as the handle B. The handle B is, however, securely fastened to the pivot $B^\times$, while the handle $B^2$ is loose on the pivot $B^\times$. As shown clearly in Fig. 13, the pivot $B^\times$ is formed with a lug $b$, which is adapted to move back and forth in a slot $b'$ in the handle $B^2$. It will be clear, therefore, that the handle B can be moved upwardly to a certain extent without moving the handle $B^2$; but when the lug $b$ comes against the end $b^2$ of the slot both handles are raised together. When the breech is closed, the ring-handle is folded down in front of the handle B, which is suitably shaped to accommodate it, as clearly shown in Fig. 4.

The firing-pin E is located centrally in the breech-block and is adapted to slide longitudinally therein, as usual, being forced forward by a spring $e'$.

A cocking-lever F, pivoted at $f$ in the rear end of the block A, has a downwardly-projecting arm $f'$, entering a slot $e^2$ in the pin E, and a rearwardly-extending arm $f^2$, engaging a cam-surface B' on the inner end of the radial handle B. When the handle is raised, the arm $f^2$ is moved forward and the firing-pin is drawn back, and when drawn back is engaged by the sear, which is shown in working position in Fig. 5. As there shown and as shown in detail in Fig. 8, the sear H is pivoted at $h$ in the breech-block and it is provided with a spring $h'$, which tends to force its front end downwardly to engage with a notch $e$ in the head of the pin.

The sear is operated by a button $i'$, with which the stem $i^2$ of another button $i$ is adapted to engage. Normally the stem of the button $i$ is withdrawn from engagement with the button $i'$ by a spring $i^3$, and so there is a space left between the end of the stem and the button for allowing the breech-block to be withdrawn. A bell-crank lever I, pivoted on a pin I', engages with the button $i$, and by operating the bell-crank lever the button $i'$ may press against the rear end of the sear to cause its front end to disengage from the firing-pin and permit it to shoot forward.

A spring-catch J is secured in a recess in the carrier-ring D, and when the ring is closed against the face of the gun the head of the catch rests on an inclined seat $j'$ in the breech of the gun, and this inclined seat is so shaped that when the carrier-ring is moved toward the breech, the head $j$ rides up along the incline away from the breech-opening; but when the ring is moved rearwardly the head of the catch springs downward in front of the breech-block and prevents it from being moved forward until the ring is moved to its proper position to enable the breech-block to be inserted in the breech-opening.

The extractor K lies in a longitudinal groove $k$ in the breech below the seat of the breech-block A. A projection K' on the inner face of the extractor enters a bayonet-groove $a'$, passing part way around the breech-block. The arrangement is such that as the breech-block turns the screw-threads cause it to be drawn rearwardly, and it carries the extractor back with it for a short distance and so loosens the cartridge-case in the bore of the gun. The groove $a'$, however, is so formed that when the breech-block is unlocked it can be drawn back without drawing the extractor back with it. The extractor is formed on its front end with a claw $k'$, as usual. It is also formed with downwardly-projecting lugs $L^3$, between which projects the inner end of a lever L, arranged in a slot or groove $l'$, formed in the gun. This lever is pivoted on a pivot-screw L', and its outer end $l$ is adapted to engage with a cam-surface $d$ and a lug D', carried by and moved with the carrier-ring D. The arrangement is such that as the carrier-ring is opened the cam-surface $d$ acting on the end $l$ of the lever, causes the extractor to be withdrawn slowly, and then the lug D', coming in contact with the lever, causes the extractor to be operated quickly and the cartridge-case to be forcibly ejected.

A safety-catch lever G is pivoted by a pivot-screw $g^\times$ to the breech-block in front of a plate A', secured to the breech-block by means of screws $A^2$. The lower arm $g'$ of the lever G extends into a groove $d'$ (see Figs. 11 and 12) in the carrier-ring D, and is adapted to move therein. A spring $g^2$, secured at its end $g^3$ to the breech-block, bears against the arm $g'$ and tends to move the head $g^4$ of the catch into the notch $g$ of the radial handle B, when in line therewith. When the breech-block is closed, the arm $g'$ of the safety-catch is in engagement with the end $d^2$ of the slot $d'$, and the head $g^4$ is withdrawn from the handle B, and the handle may then be moved downwardly to the position which it occupies when the gun is ready for firing; but when the breech-block is not in firing position, the head $g^4$ engages the handle B below its pivot, and so the handle cannot be moved downwardly. It will be remembered that when the handle B was moved upwardly it operated the cocking-lever F to draw back the firing-pin to permit its engagement by the sear H, and as long as the handle was elevated the firing-pin could not shoot forward, even though the sear were released, and the handle could not be moved to release the cocking-lever as long as the breech-block was withdrawn from the breech; but when the breech-block is inserted and is in firing position the handle B is released from engagement with the safety-catch lever G the handle may move downwardly, and then the cocking-lever F is released and does not tend to hold the firing-pin back, it being then held only by the sear.

The gun is operated as follows: Assuming that the gun has just been fired, to open the breech the radial handle B is first raised to the position shown by dotted lines in Fig. 4. At first the handle B moves without raising the ring-handle $B^2$, as before explained; but afterward the handle $B^2$ is raised with the handle B, and so when the radial handle is in the position shown by dotted lines in Fig. 4 the ring-handle will project out at about right angles to the rear face of the breech-block in convenient position for the hands of the operator. In the operation of elevating the radial handle the cocking-lever F is moved to draw back the firing-pin and the sear H engages with the notch $e$ in the head of the pin. By then turning the radial handle to the left the safety-catch lever G engages with the notch $g$ in the handle and prevents it from being moved downwardly until the breech-block is again screwed home. When the handle has been moved through an arc of about sixty degrees, the screw-threads are disengaged and the block may be withdrawn by means of the ring-handle $B^2$; but while the block was being turned it was moved backward to some extent and with it moved backwardly the extractor by means of the lug $K'$, which is in the bayonet-groove $a'$, thus loosening the cartridge-case. When the block is sufficiently turned, however, the lug $K'$ enters the longitudinal part of the bayonet-groove $a'$ and the block may be withdrawn without further movement being given to the extractor. When the block is withdrawn, the ring is swung on its pivot by means of the ring-handle $B^2$, and just as the ring moves away from the rear face of the gun the catch J, being disengaged from its inclined seat $j'$, springs into position in front of the breech-block, and therefore prevents its moving forward so long as the ring is withdrawn from the gun. As the ring is swung on its pivot, the cam-surface $d$ and the lug $D'$, operating on the lever L, actuate the extractor to expel the cartridge-case. The movements in loading are similar. The cartridge is first inserted as far as the extractor will allow it to go, and the ring is then swung around until the breech-block is in rear of the cartridge. In this movement the spring-catch J, which retains the breech-block in the ring, comes against its inclined seat $j'$ on the breech of the gun, and is thereby withdrawn. The breech-block, being thus set free, is thrust forward, and as it advances drives the cartridge home. The breech-block is then turned and locked, and as this movement is completed the catch-lever G releases the radial handle. This is then folded down, and in consequence the cocking-lever F is set free, and the firing-pin can then advance when the sear releases it. The gun is fired by pulling a lanyard attached to the bell-crank lever I, which causes the disengagement of the sear from the head of the firing-pin, and the pin is shot forward by its spring.

I claim as my invention—

1. In a breech-loading gun, the combination of the breech-block, a radial handle pivoted thereto, a firing-pin adapted to move back and forth in the breech-block, a cocking-lever engaging with the firing-pin and operated by the radial handle, and means for locking the radial handle in position to prevent a movement of the cocking-lever and the firing-pin connected with it, the arrangement being such that as the radial handle is raised it withdraws the firing-pin and as the breech-block is turned the handle is locked and the firing-pin is held against a forward movement.

2. In a breech-loading gun, the combination of the breech-block, a radial handle jointed thereto, the firing-pin adapted to move back and forth in the breech-block, the cocking-lever engaging with the firing-pin, and the locking-lever pivoted to the breech-block and adapted to engage with the radial handle, the arrangement being such that as the radial handle is raised it withdraws the firing-pin and as the breech-block is turned the handle is locked and the firing-pin is held against a forward movement.

3. In a breech-loading gun, the combination of the breech-block, the carrier-ring, means for withdrawing the breech-block from the gun into the carrier-ring, means for withdrawing the carrier-ring from the breech of the gun, and a retaining-catch for locking the block in the ring and retaining it until the ring returns into position against the breech end of the gun, and a device on the gun for releasing the catch.

4. In a breech-loading gun, the combination of the breech-block, the carrier-ring jointed to the breech of the gun, the extractor, the lever operatively connected with the extractor, and a cam-surface or lug on the carrier-ring which operates upon the lever and thereby moves the extractor.

5. In a breech-loading gun, the combination of a breech-block, means for locking it in the breech of the gun, a carrier-ring jointed to the breech of the gun, an extractor connected with and operated by the breech-block, and means carried by the carrier-ring for imparting a further movement to the extractor, the organization being such that the extractor is first moved to a small extent by the breech-block, is then released by the breech-block, and a further movement given to it by the carrier-ring.

CARL HOLMSTRÖM.

Witnesses:
 THOMAS LAKE,
 T. J. OSMAN,
*Both of No. 17 Gracechurch Street, London, England.*